(12) United States Patent
Popp

(10) Patent No.: US 8,212,784 B2
(45) Date of Patent: Jul. 3, 2012

(54) SELECTION AND DISPLAY OF MEDIA ASSOCIATED WITH A GEOGRAPHIC AREA BASED ON GESTURE INPUT

(75) Inventor: Bogdan Popp, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/955,417

(22) Filed: Dec. 13, 2007

(65) Prior Publication Data
US 2009/0153492 A1 Jun. 18, 2009

(51) Int. Cl.
*G06F 3/041* (2006.01)
(52) U.S. Cl. ............... 345/173; 178/18.01; 382/113
(58) Field of Classification Search .............. 345/173; 178/18.01; 701/211, 213, 418, 432; 340/539.13; 715/863; 382/113
See application file for complete search history.

(56) References Cited

U.S. PATENT DOCUMENTS

| | | | |
|---|---|---|---|
| 6,282,362 B1 | 8/2001 | Murphy et al. | |
| 6,321,158 B1 | 11/2001 | DeLorme et al. | |
| 6,437,797 B1 | 8/2002 | Ota | |
| 6,504,571 B1 | 1/2003 | Narayanaswami et al. | |
| 6,686,970 B1 | 2/2004 | Windle | |
| 6,741,864 B2 | 5/2004 | Wilcock et al. | |
| 6,898,525 B1 * | 5/2005 | Minelli | 701/213 |
| 7,009,643 B2 | 3/2006 | Nakamura et al. | |
| 7,268,773 B2 * | 9/2007 | Ludtke | 345/173 |
| 7,487,114 B2 * | 2/2009 | Florance et al. | 705/27.2 |
| 7,676,376 B2 * | 3/2010 | Colman | 705/1.1 |
| 2007/0110338 A1 | 5/2007 | Snavely et al. | |
| 2007/0233368 A1 | 10/2007 | Friedmann | |

OTHER PUBLICATIONS

Hilliges, et al., "Photohelix: Browsing, Sorting and Sharing Digital Photo Collections",Second Annual IEEE International Workshop on Horizontal Interactive Human-Computer Systems,(TABLETOP'07), 2007, pp. 3.
Vroegindeweij , "My Pictures: Informal Image Collections", Hewlett-Packard Company, 2002 , pp. 105.

* cited by examiner

*Primary Examiner* — Abbas Abdulselam
(74) *Attorney, Agent, or Firm* — Alleman Hall McCoy Russell & Tuttle LLP

(57) ABSTRACT

An interactive media display system is provided to display media associated with a selected geographic area based on a gesture input of user. The interactive media display system may include a touch-sensitive display surface configured to display a geographic map and receive a gesture input generated by a user on the touch-sensitive display surface while the geographic map is displayed, the gesture input defining a selected geographic area on the geographic map. The system may further include a controller configured, in response to the gesture input, to filter the media data based on position data to determine a filtered media data collection including media that are associated with the selected geographic area, and to command the touch-sensitive display surface to display the media in the filtered media data collection.

20 Claims, 5 Drawing Sheets of user on the touch-sensitive display surface 14 while the geographic map 50 is displayed. The interactive display device 12 may further include a controller 16 configured to receive the gesture input 52 from the touch-sensitive display surface 14, and recognize that the gesture input 52 defines a selected geographic area 56 on the geographic map 50. In response to the gesture input 52, the controller 16 may be further configured to filter media 66 in one or more data stores 18 based on metadata 68, including position data, associated with the media 66 to determine a filtered media data collection 70 of media 66 that are associated with the selected geographic area 56. The controller may further be configured to retrieve the filtered media data collection 70 from the data store 18, and command the touch-sensitive display surface 14 to display the media 66 in the filtered media data collection 70.

SELECTION AND DISPLAY OF MEDIA ASSOCIATED WITH A GEOGRAPHIC AREA BASED ON GESTURE INPUT

BACKGROUND

Digital media equipment, such as digital cameras, digital audio recorders and digital video cameras, have become increasingly popular among the general population in recent years, generating large numbers of media files. Using current media file management systems, which in general organize and search media files according to folder name, file name, and/or date and time of creation, it is often difficult to conveniently locate a desired media file. In particular, there is no suitable way with current media file management systems for a user to conveniently locate and display a media file associated with a particular geographic location, as well as time of creation, and/or other media attributes.

SUMMARY

An interactive media display system is provided to display media associated with a selected geographic area based on a gesture input of user. The interactive media display system may include a touch-sensitive display surface configured to display a geographic map and receive a gesture input generated by a user on the touch-sensitive display surface while the geographic map is displayed, the gesture input defining a selected geographic area on the geographic map. The system may additionally include a data store for storing map data and media data. The media data may include media and metadata associated with the media. The metadata may include, for example, position data associated with the media. The system may further include a controller configured to receive the gesture input from the touch-sensitive display surface, and in response to the gesture input, to filter the media data based on the position data to determine a filtered media data collection including media that are associated with the selected geographic area, and to command the touch-sensitive display surface to display the media in the filtered media data collection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
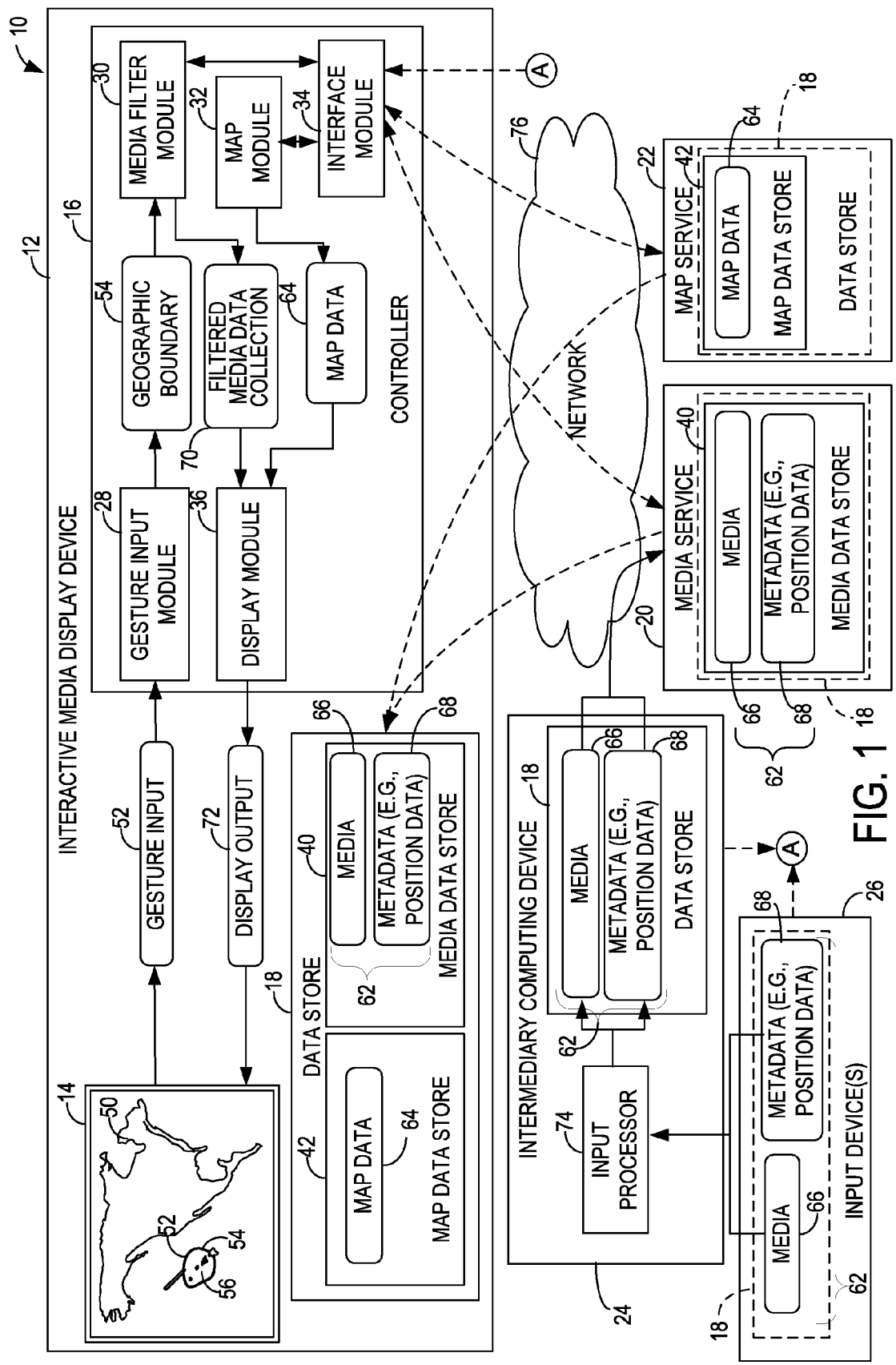
FIG. 1 is a schematic diagram illustrating an interactive media display system having an interactive media display device with a touch-sensitive display surface for displaying media associated with a selected geographic area based on a gesture input of a user.

As illustrated in FIG. 1, an interactive media display system 10 is provided, the interactive media display system 10 including an interactive display device 12 having a touch-sensitive display surface 14 configured to display a geographic map 50 and receive a gesture input 52 generated by a user on the touch-sensitive display surface 14 while the geographic map 50 is displayed. The interactive display device 12 may further include a controller 16 configured to receive the gesture input 52 from the touch-sensitive display surface 14, and recognize that the gesture input 52 defines a selected geographic area 56 on the geographic map 50. In response to the gesture input 52, the controller 16 may be further configured to filter media 66 in one or more data stores 18 based on metadata 68, including position data, associated with the media 66 to determine a filtered media data collection 70 of media 66 that are associated with the selected geographic area 56. The controller may further be configured to retrieve the filtered media data collection 70 from the data store 18, and command the touch-sensitive display surface 14 to display the media 66 in the filtered media data collection 70.

The touch-sensitive display surface 14 may be a multiple touch-sensitive display surface configured to acquire gesture input 52 at a plurality of locations on the touch-sensitive display surface 14 at a given time, enabling multiple users and/or multiple fingers of a user to interact with the touch-sensitive display surface 14. Thus, a gesture input 52 from one or more fingers of one or more users may be recognized by the controller 16.

Turning to the inner workings of the controller 16, the controller 16 may be configured to execute a gesture input module 28 that is configured to receive the gesture input 52 from the touch-sensitive display surface 14 and identify a geographic boundary 54 associated with the gesture input 52 that defines the selected geographic area 56. As illustrated in FIGS. 2-5 and described below, the gesture input module 28 may be configured to recognize gesture input 52 such as a manually-drawn boundary gesture input 78, a press-and-hold drawn boundary box gesture input 80, finger-pinch drawn boundary box gesture input 82, and a manually drawn line boundary box gesture input 84.

The controller 16 may be further configured to execute a media filter module 30 that is configured to receive the geographic boundary 54 from the gesture input module 28, and in response to the geographic boundary 54, to filter the media data 62 stored in one or more of the data stores 18 based on the metadata 68, such as the position data, to obtain a filtered media data collection 70 including media associated with the selected geographic area 56.

The controller 16 may be further configured to execute a map module 32 that is configured to access the map data 64 from the data stores 18. The map data 64 may include data for generating the geographic map 50, including data for rendering aerial images, streets, political boundaries, buildings, geographic features, and other map features.

Figure 6:
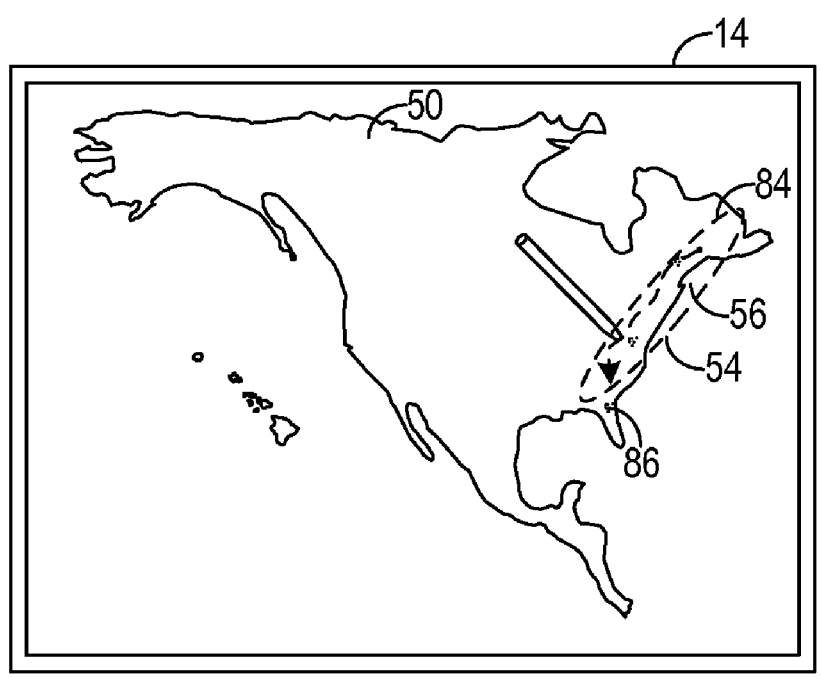
FIG. 6 is a screen of the touch-sensitive display surface of the interactive media display system of FIG. 1, illustrating a manually-drawn line boundary box gesture input drawn with a stylus.

The controller 16 may be additionally configured to execute a display module 36. The display module 36 may be configured to receive the map data 64 from the map module 32, and cause the geographic map 50 encoded in the map data 64 to be displayed on the touch-sensitive display surface 14. The display module 36 may also be configured to receive the filtered media data collection 70 from the media filter module 30, and cause the media in the filtered media data collection 70 to be displayed on the touch-sensitive display surface 14. The display may be effected by a display output 72 sent from the display module 36 to the touch-sensitive display surface 14. The display of the filtered media data collection 70 may be in a suitable form, such as thumbnails, previews, lists, slideshows, audio clips, and/or video clips. The filtered media data collection 70 may be displayed as an overlay on the geographic map 50. For example, thumbnails 86 of photographs associated with a geographic location may be overlaid on the geographic map 50 at that particular geographic location as illustrated in FIG. 6.

The controller 16 may be configured to execute an interface module 34 configured to provide an interface between the data stores 18 and each of the media filter module 30 and the map module 32. The interface module 34 may be configured to send out a filter media data command to cause media data 62 stored in the media data store 40 of the data store 18 to be filtered based on the metadata 68, such as the position data 88. The filter media data command may be generated based on the geographic boundary 54 associated with the gesture input 52. The interface module 34 may be configured to send out a filter map data command to cause map data 64 stored in the map data store 42 of the data store 18 to be filtered according to the filter map data command. The filter map data command may be generated based on the gesture input 52.

As discussed above, one or more data stores 18 may be provided. The data stores 18 may be configured to store map data 64 for the geographic map 50 and media data 62. The stored media data 62 may include media 66 and metadata 68 associated with the media 66, the metadata 68 including position data indicating a geographic position at which the media was recorded. The data stores 18 may be locally provided on the interactive media display device 12, remotely located at a media service 20 and/or map service 22, or located on an input device 26 or intermediary computing device 24, via a peripheral or peer-to-peer connection. Thus, it will be appreciated that the interface module 34 may be configured to communicate over a computer network 76, such as a wide area network, with the various devices on which the data stores 18 are located. In some cases, such as when communicating with input device 26 or intermediary computing device 24, the interface module 34 may also be configured to communicate via a wired or wireless peripheral device connection, or local area network connection, as illustrated at A in FIG. 1.

One or more of the data stores 18 may include a map data store 42 for storing the map data 64 and a media data store 40 for storing the media data 62. In the depicted embodiment, the map data store 42 is maintained on and accessed via a map service 22 executed on a map server configured to be accessible by multiple users of the map service 22. Further, in the depicted embodiment, the media data store 40 is maintained on and accessed via a media service 20 executed on a media server configured to store media data 62 of multiple subscribers of the media service 20. As discussed above, in addition or as an alternative to the data store 18 on the media server, the interactive display device 12 may be configured to communicate with a data store 18 on each input device 26, an intermediary computing device 24, and/or on the interactive display device 12 itself, each of which are configured to store media data 62.

To upload media data 62 to the media server on which media service 20 is executed, interactive media display system 10 may further include one or more input devices 26 and intermediary computing devices 24, which may be used by the same or a different user than the user of interactive display device 12. The input device 26 may include a position sensing system for determining a position of the input device at a time when media is recorded, and recording the position as the position data. The position sensing system may include a global positioning system (GPS) for tracking position of the input device 26 via a satellite network. The position sensing system of the input device 26 may further include a compass for determining a compass direction indicating the directional orientation of the input device 26, and an altimeter for generating altitude data. Thus, the position sensing system may be configured to generate position data including longitude, latitude, altitude, and compass direction.

A clock may also be provided in input device 26 to record metadata 68 indicating the time and date at which the media were recorded. Using the time and date data, the input device 26, or alternatively the intermediary computing device 24 or other computing device within interactive media display system 10, may be configured to compute derivative data of the position data, including speed and/or acceleration at which the media data 62 were captured. In addition, the input device 26 may be configured to record metadata 68 indicating the type (e.g., brand, model, etc.) of input device 26 used to capture the media data 62.

It will be appreciated that the input device 26 may be a single unitary device, or may include a plurality of separate devices. For example, a unitary GPS enabled digital camera may function as input device 26. Alternatively, a digital camera and associated GPS unit may be provided as separate input devices 26, and the media captured by the digital camera may be linked with position data recorded by the GPS unit at the intermediary computing device 24, as described below.

The media data 62 captured by the input device 26 may be uploaded onto the intermediary computing device 24 via an input processor 74 of the intermediary computing device 24. Where the media 66 include embedded metadata 68, the input processor 74 may be configured to separate the media 66 and metadata 68 into separate data containers, and link each media file with associated metadata, and link each media file with associated metadata. The input processor 74 may also be configured to upload the separated media 66 and metadata 68 files to the data store 18 associated with media service 20. For example, the input processor 74 may, during uploading a jpeg file that includes image data embedded with global positioning system (GPS) data, and may separate and link the image data and the GPS data and upload them to the media service 20 as separate but linked data. The image data may be uploaded as the media 66 and the GPS data may be uploaded the metadata 68 associated with the media 66. Where separate input devices device are used to capture metadata 68 with the position data and media 66, the input processor 74 may be configured to link the resulting separate media 66 and metadata 68 associated with the media 66. This may be accomplished, for example, by matching time and date data encoded in each of the meta data 68 and media 66, to link the appropriate position data and other metadata 68 with the appropriate media 66.

In an example use-scenario of the interactive media display system 10 of FIG. 1, a user may capture photographs using an input device 26, such as a digital camera with an integrated GPS unit, during various trips at various times around the world. The captured photographs may include image data and metadata associated with the image data, such as GPS position data. The user may subsequently upload the photographs from the digital camera onto the data store 18 of the interactive media display system 10 located on the interactive display device 12, using an intermediary computing device 24, such as a personal computer of the user executing appropriate software. The intermediary computing device separates out and links the image data from the metadata, stores a copy on the intermediary computing device, and uploads the images and position data to the data store 18 on media service 20.

The user may later wish to access these images based on various metadata associated with the photographs, including position data. For example, the user may wish to access photographs take during a trip to Hawaiian Islands five years ago at sea level using the interactive media display system 10. At an interactive media display device 12 of the interactive media display system 10, a geographic map 50 is first displayed on a touch-sensitive display surface 14 of the interactive media display device 12. The map data 64 encoding the geographic map 50 is accessed by a map module 32 of a controller 16 of the interactive display device 12 from a map data store 42 located on a server of a map service 22 executed on a map server.

To access the images, the user then draws a manually drawn boundary gesture input 78 encircling the Hawaiian Islands on the geographic map 50 displayed on the touch-sensitive display surface 14. The gesture input 52 is passed to a gesture input module 28 of the controller 16 of the interactive media display device 12. The gesture input module 28 processes the gesture input 52 of the user to identify a geographic boundary 54 that identifies the Hawaiian Islands as a selected geographic area 56. The user may also identify the time frame of interest and the altitude of interest using the touch-sensitive display surface 14, for example via a suitable date and time selector and a suitable altitude selector provided on a graphical user interface of the touch-sensitive display surface 14.

The identified geographic boundary 54 is then passed to a media filter module 30 of the controller 16. The media filter module 30 filters the media data 62 in data store 18 for images based on the metadata 68 stored in data store 18 to identify a collection of images that were taken 5 years ago in the Hawaiian Islands at sea level.

The media filter module 30 utilizes the interface module 34 to send out commands from the media filter module 30 to the relevant data stores 18 to search for the collection of images taken 5 years ago on the Hawaiian Islands at sea level. In some embodiments, the media filter module 30 may be configured to search all data stores 18 that are currently connected to the interactive media display device 12, and download images from each that have position data within the selected geographic area. In other embodiments, the filter module 30 may be configured to only search the data store 18 at the media service 20 and in response obtain a list of the images in the collection. The interface module 34 may be configured to determine whether a cached copy of any of the images exists on the locally provided data store 18 on the interactive media display device 12. Where no cached copy is available, the interface module 34 may then command the data store to send the images on the list if it determines that the images are not available on the local data store.

Once the collection of images is obtained from the one or more data stores 18, it is passed from the media filter module 30 to the display module 36. The display module 36 in response outputs a display output 72 to the touch-sensitive display surface 14 and causes the filtered collection of images to be displayed on the touch-sensitive display surface 14.

Since the touch-sensitive display surface 14 is a multiple touch-sensitive display surface 14 configured to acquire gesture input at a plurality of locations at a given time, it will be appreciated that a second user desiring to view photographs from a different geographic area on The Hawaiian Islands may input a second gesture input at the same time as the first user described above. This second gesture input is processed in the manner described above, and a second filtered collection of images is determined and displayed to the second user on the touch sensitive display surface 14.

Figure 2:
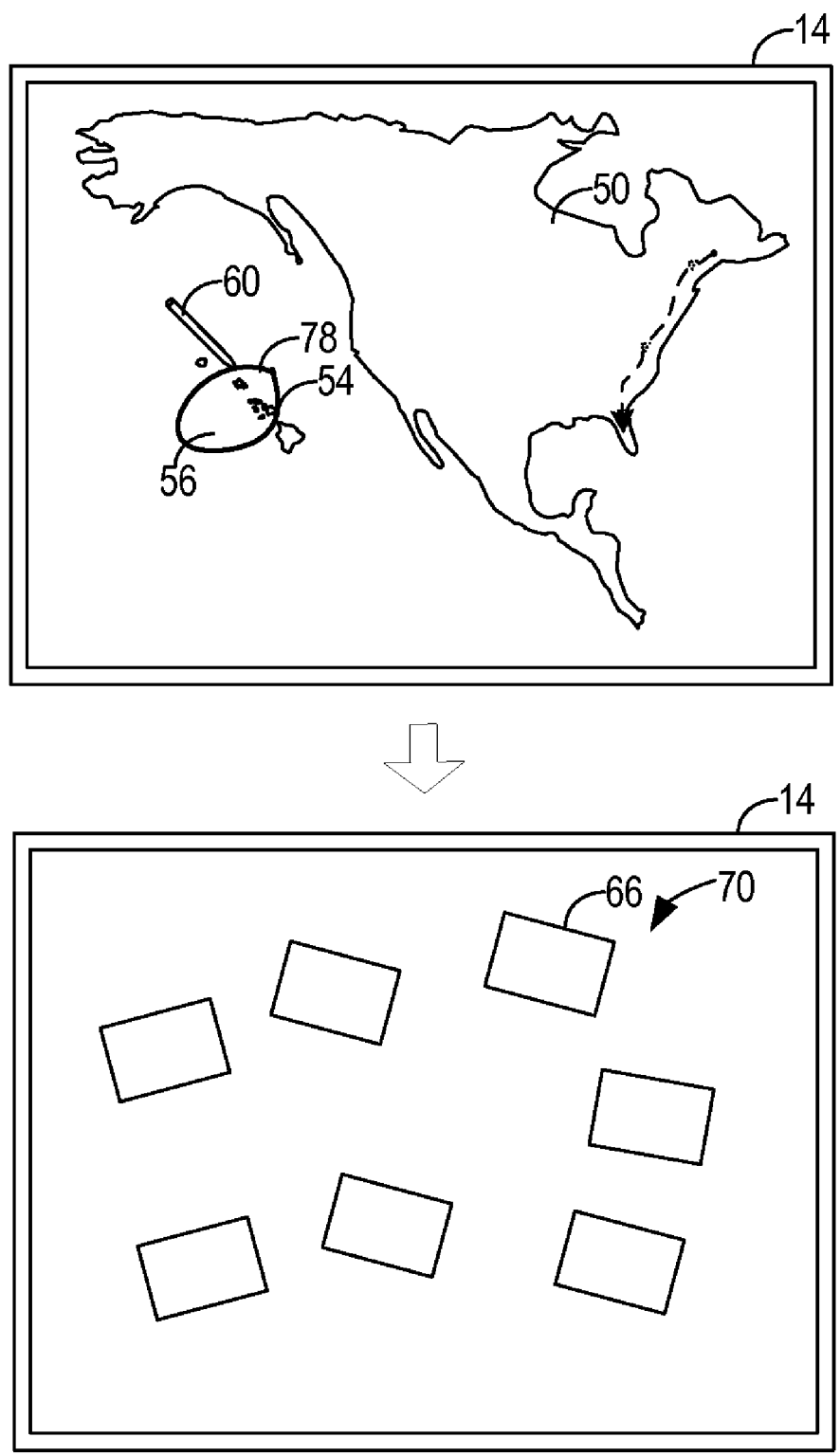
FIG. 2 shows two representations of the touch-sensitive display surface of the interactive media display system of FIG. 1, illustrating the input of a gesture input, and the display of media associated with a selected geographic area based on the gesture input.

FIG. 2 shows two representations of the touch-sensitive display surface 14 of the interactive media display system of FIG. 1, illustrating the input of a gesture input 52 and the display of media 66 associated with a selected geographic area 56 based on the gesture input 52. At the top in FIG. 2, the geographic map 50 is shown displayed on the touch-sensitive display surface 14, and the manually drawn boundary gesture input 78 is shown drawn on the touch-sensitive display surface with a stylus 60. At the bottom in FIG. 2, the filtered media data collection 70 of media 66 associated with the selected geographic area 56 are displayed on the touch-sensitive display surface 14. In the depicted embodiment, the filtered media data collection 70 includes preview images of photographs, full versions of which can be displayed upon selection by a user.

Figure 3:
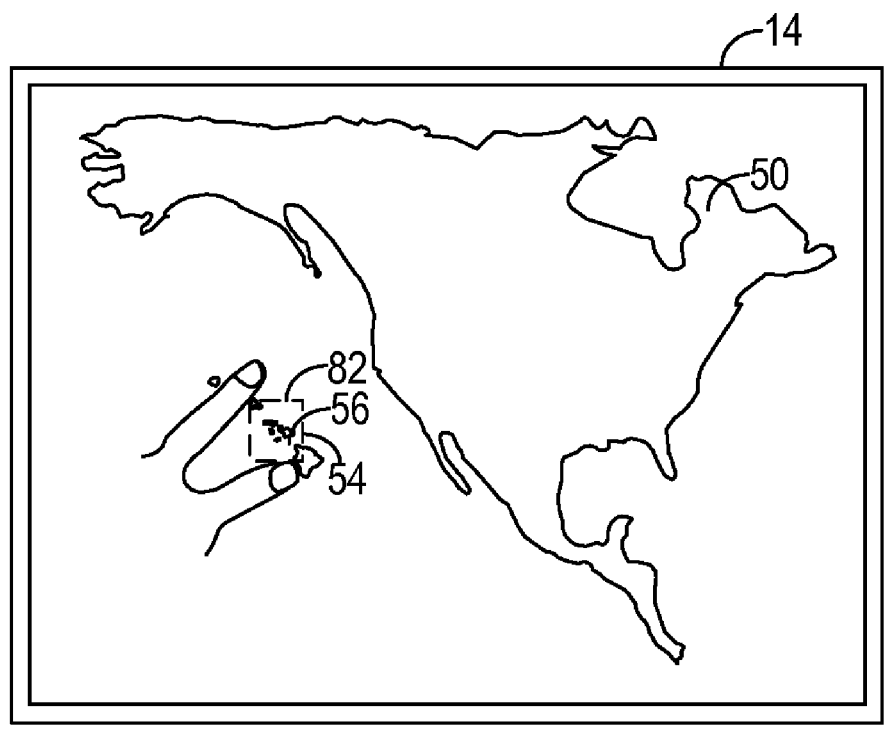
FIG. 3 is a screen of the touch-sensitive display surface of the interactive media display system of FIG. 1, illustrating a finger-pinch drawn boundary box gesture input.

FIG. 3 is a screen of the touch-sensitive display surface of the interactive media display system of FIG. 1, illustrating a finger-pinch drawn boundary box gesture input 82. A finger-pinch made with the thumb and the index finger of a user produces a finger-pinch drawn boundary box gesture input 82 that include a rectangular shaped geographic boundary 54 in a space between the thumb and the index finger that defines a selected geographic area 56.

Figure 4:
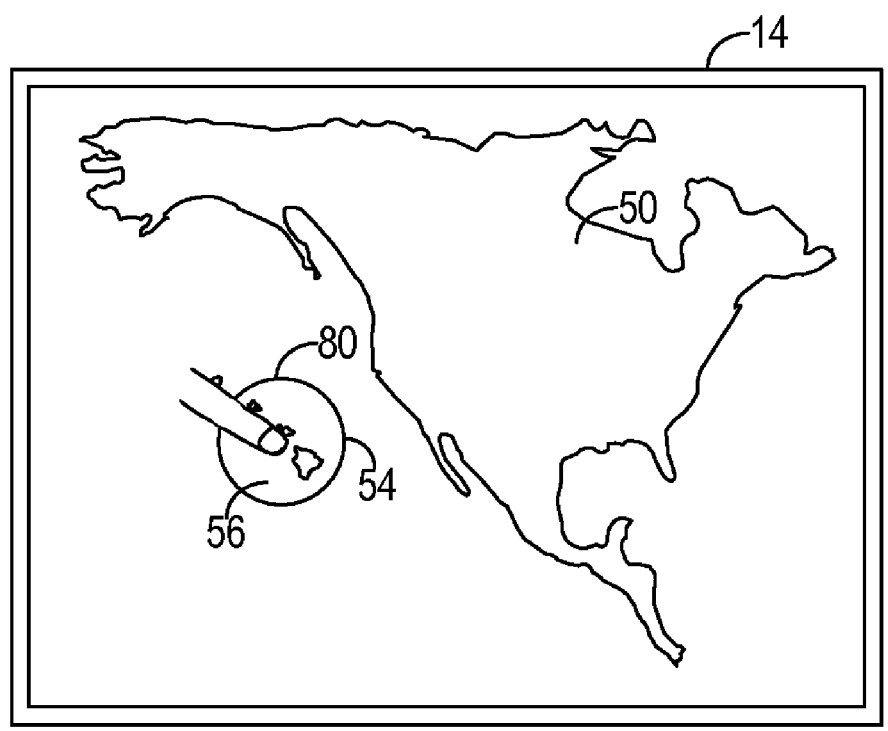
FIG. 4 is a screen of the touch-sensitive display surface of the interactive media display system of FIG. 1, illustrating a press-and-hold boundary box gesture input made by a digit of a user.

FIG. 4 is a screen of the touch-sensitive display surface of the interactive media display system of FIG. 1, illustrating a press-and-hold boundary box gesture input 80 made by a finger of a user. A circular geographic boundary 54 is shown drawn when a user press and hold a finger on the touch-sensitive display surface 14. Alternatively, the geographic boundary 54 may be formed in a shape other than a circle, such a polygon or oval. The geographic boundary 54 may grow as the finger is pressed and held on the touch-sensitive display surface 14. The longer the hold, the bigger the geographic boundary 54 that is drawn on the touch-sensitive display surface 14.

Figure 5:
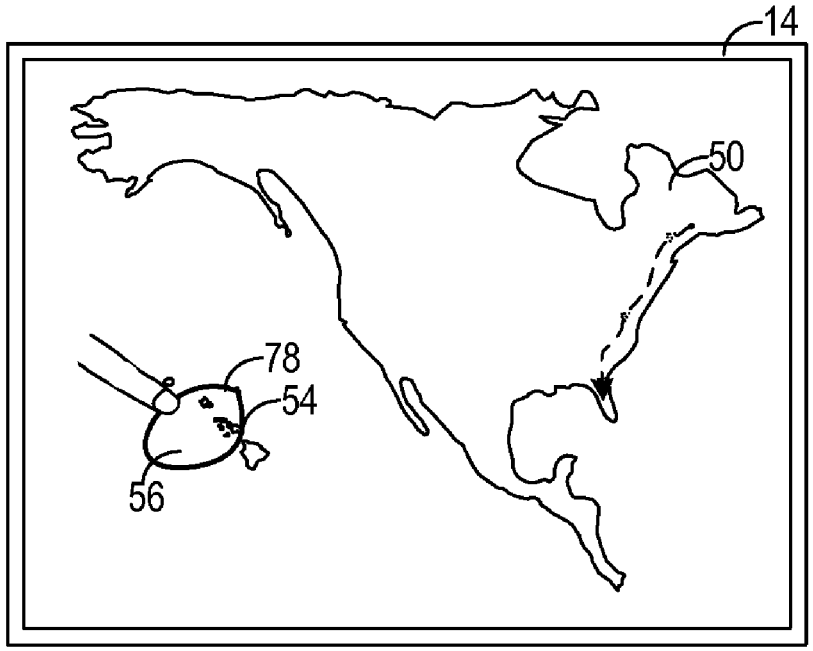
FIG. 5 is a screen of the touch-sensitive display surface of the interactive media display system of FIG. 1, illustrating a manually-drawn boundary gesture input drawn by a digit of a user.

FIG. 5 is a screen of the touch-sensitive display surface of the interactive media display system of FIG. 1, illustrating a manually-drawn boundary gesture input 78 drawn with a finger of a user. The manually-drawn boundary gesture input 78 may also be drawn with a device, such as a stylus 60 as illustrated in FIG. 2.

FIG. 6 is a screen of the touch-sensitive display surface 14 of the interactive media display device 12 of the interactive media display system 10 of FIG. 1, illustrating a manually-drawn line boundary box gesture input 84 drawn with a stylus. A geographic boundary 54 may be drawn around a manually-drawn line to define a selected geographic area 56 along the manually-drawn line. Thumbnails 86 of photographs associated with a geographic location may be overlaid on the geographic map 50 at the selected geographic area 56, as described above.

Figure 7:
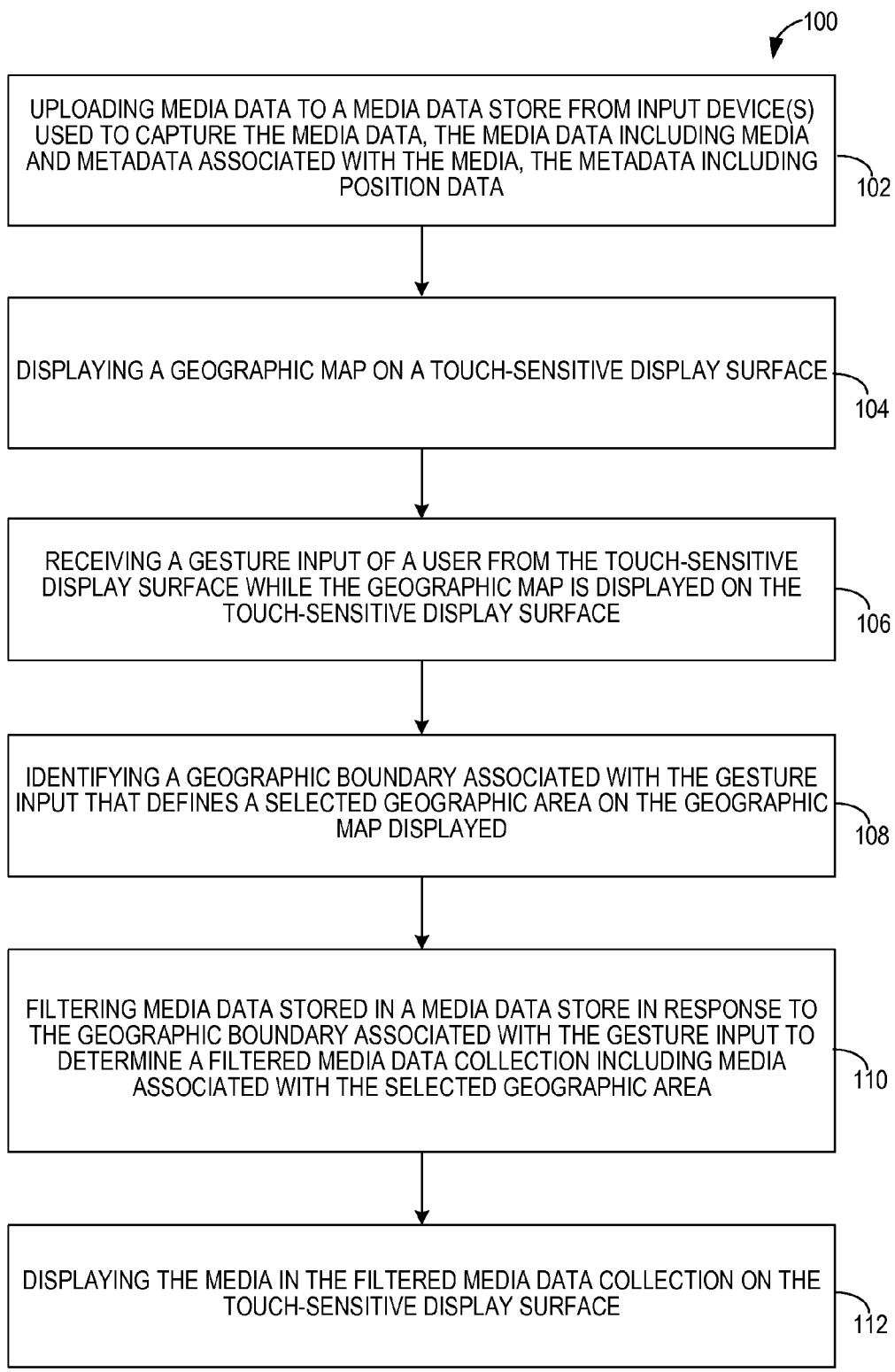
FIG. 7 is a flowchart of an embodiment of a method for displaying media data associated with a selected geographic area based on gesture input.

FIG. 7 is a flowchart of an embodiment of a method 100 for displaying media data associated with a selected geographic area based on gesture input. The method 100 may be implemented on the interactive media display system of FIG. 1, or on other suitable computer hardware components, as desired.

The method 100 may include, at 102, uploading media data to a media data store from one or more input devices used to capture the media data. As described above, the media data may include media and associated metadata, which in turn includes position data associated with the media. The position data may include data selected from the group consisting of longitude, latitude, altitude, and compass direction. Other metadata may also be included, as described above.

At 104, the method may further include displaying a geographic map on a touch-sensitive display surface of an interactive media display device. Prior to displaying the geographic map, the method may further include accessing map data for the geographic map from a data store associated with a map service executed on a map server, via a computer network. As described above, the map service may be configured to be accessible by multiple users of the map service.

At 106, the method may further include receiving a gesture input from a user while the geographic map is displayed on the touch-sensitive display surface. At 108, the method may further include identifying a geographic boundary associated with the gesture input, the geographic boundary defining a selected geographic area on the geographic map.

At 110, the method may further include filtering media data stored in a media data store in response to the geographic boundary associated with the gesture input to determine a filtered media data collection including media associated with the selected geographic area. As discussed above, the media data may include media and associated metadata including position data, and the determination of the filtered media data collection may be based on the position data associated with the media data. In addition, the determination of the filtered media data collection may be further based on metadata other than the position data. As discussed above, the media data store from which the media data is filtered may be associated with a media service executed on a server, the media service being configured to store media data of multiple subscribers of the media service.

At 112, the method further includes displaying the collection of media data on the touch-sensitive display surface.

Using the above systems and methods, a user may efficiently access stored media associated with a geographic area, using a gesture input on a geographic map displayed on a touch sensitive display surface, without searching for media files in a folder hierarchy of a file system.

It will be appreciated that the computing devices described herein may be servers, personal computers, laptop computers, portable data assistant (PDA), or other type of suitable computing device, and the input devices described herein may be any suitable type of device configured to capture digital media, including a digital camera, digital video camera, digital audio recorder, camera-equipped mobile telephone, or other suitable device. These devices typically include a processor and associated volatile and non-volatile memory, and are configured to execute programs stored in non-volatile memory using portions of volatile memory and the processor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An interactive media display system, comprising:
   a touch-sensitive display surface configured to display a geographic map and receive a gesture input generated by a user on the touch-sensitive display surface, the gesture input defining a selected geographic area on the geographic map;
   a data store for storing map data and media data, the media data including media and metadata associated with the media, the media is selected from the group consisting of thumbnails of photographs, previews of images of photographs, lists of images, slideshows, audio clips, and video clips, and the metadata including position data indicating a geographic position at which the media was recorded; and
   a controller configured to receive the gesture input from the touch-sensitive display surface, and in response to the gesture input, to filter the media data based on the position data indicating the geographic position at which the media was recorded to determine a filtered media data collection that includes media associated with the selected geographic area, and to command the touch-sensitive display surface to display the media in the filtered media data collection.

2. The interactive media display system of claim 1, wherein the touch-sensitive display surface is a multiple touch-sensitive display surface configured to acquire gesture input at a plurality of locations on the touch-sensitive display surface at a given time, enabling multiple users and/or multiple fingers of a user to interact with the touch-sensitive display surface.

3. The interactive media display system of claim 2, wherein the data store includes a map data store for storing the map data and a media data store for storing the media data, the map data store being maintained on and accessed via a map service configured to be accessible by multiple users of the map service, and the media data store being maintained on and accessed via a media service configured to store media data of multiple subscribers of the media service.

4. The interactive media display system of claim 3, wherein the media data store further includes a data store of an intermediary computing device configured to upload the media data from an input device used to capture the media and/or the metadata associated with the media.

5. The interactive media display system of claim 1, wherein the controller is configured to execute a gesture input module that is configured to receive the gesture input from the touch-sensitive display surface and identify a geographic boundary associated with the gesture input that defines the selected geographic area.

6. The interactive media display system of claim 5, wherein the controller is further configured to execute a media filter module that is configured to receive the geographic boundary from the gesture input module, and in response to the geographic boundary, to filter the media data stored in the data store based on the position data to obtain the filtered media data collection.

7. The interactive media display system of claim 6, wherein the controller is further configured to execute a map module that is configured to access the map data from the data store.

8. The interactive media display system of claim 1, wherein the gesture input comprises a press-and-hold drawn boundary box gesture input or a finger-pinch drawn boundary box gesture input.

9. The interactive media display system of claim 1, wherein the position data in the metadata comprises altitude or compass direction.

10. The interactive media display system of claim 1, wherein the metadata includes derivative data of the position data related to speed and/or acceleration at which the media data were captured.

11. The interactive media display system of claim 1, wherein the metadata includes date and time data, and/or input device type data indicating an input device used to capture the media data.

12. The interactive media display system of claim 1, further comprising an input device including a position sensing system for determining a position of the input device at a time when media is recorded, and recording the position as the position data.

13. A method for displaying media based on gesture input, comprising:
    displaying a geographic map on a touch-sensitive display surface;
    receiving a gesture input from a user while the geographic map is displayed on the touch-sensitive display surface;
    identifying a geographic boundary associated with the gesture input that defines a selected geographic area on the geographic map displayed;
    filtering media data stored in a media data store in response to the geographic boundary associated with the gesture input to determine a filtered media data collection including media associated with the selected geographic area based on position data indicating a geographic position at which the media was recorded, the media is selected from the group consisting of thumbnails of photographs, previews of images of photographs, lists of images, slideshows, audio clips, and video clips; and
    displaying the media in the filtered media data collection on the touch-sensitive display surface.

14. The method of claim 13, wherein the media data includes media and associated metadata including the position data.

15. The method of claim 14, wherein the position data comprises altitude or compass direction.

16. The method of claim 14, wherein the determination of the filtered media data collection is further based on metadata other than the position data.

17. The method of claim 13, further comprising, prior to displaying the geographic map, accessing map data for the geographic map from a data store associated with a map service executed on a map server, via a computer network, the map service being configured to be accessible by multiple users of the map service.

18. The method of claim 13, further comprising, prior to receiving the gesture input, uploading the media data to the media data store from an input device.

19. The method of claim 13, wherein the media data store from which the media data is filtered is associated with a media service, the media service being configured to store media data of multiple subscribers of the media service.

20. A method for displaying media based on gesture input, comprising:
    from an input device, uploading media data to a media data store associated with a media service executed on a media server, the media data including media and associated metadata, the media is selected from the group consisting of thumbnails of photographs, previews of images of photographs, lists of images, slideshows, audio clips, and video clips, and the metadata including position data indicating a geographic position at which the media was recorded;
    from an interactive display device including a touch-sensitive display device, accessing map data for a geographic map from a data store associated with a map service executed on a map server;
    displaying the geographic map on the touch-sensitive display device, based on the map data;
    receiving a gesture input generated by a user from the touch-sensitive display surface while the geographic map is displayed on the touch-sensitive display surface;
    identifying a geographic boundary associated with the gesture input defining a selected geographic area on the geographic map displayed;
    filtering media data stored in the media data store in response to the geographic boundary associated with the gesture input to determine a filtered media data collection including media associated with the selected geographic area, wherein the determination of the filtered media data collection is based on the position data indicating the geographic position at which the media was recorded; and
    displaying the media in the filtered media data collection on the touch-sensitive display surface.

* * * * *